United States Patent [19]
Trudeau et al.

[11] 3,732,427
[45] May 8, 1973

[54] INTEGRATED TRANSPORT SYSTEM FOR NUCLEAR FUEL ASSEMBLIES

[76] Inventors: Arthur G. Trudeau, 17 Primrose Street, Chevy Chase, Md. 20015; Darrow F. Haagensen, P.O. Box 565, R.D. No. 3, Murraysville, Pa. 15688

[22] Filed: Mar. 17, 1971

[21] Appl. No.: 125,259

[52] U.S. Cl. ............. 250/108 R, 250/106 R, 280/29, 303/21 CF
[51] Int. Cl. .................................................. G21f 5/00
[58] Field of Search ................... 250/106 R, 106 S, 250/108 R; 105/1, 366; 280/29, 443; 303/21 CE, 21 CF; 340/48, 52

[56] References Cited

UNITED STATES PATENTS

| | | | |
|---|---|---|---|
| 2,456,939 | 12/1948 | Haase | 280/29 X |
| 2,980,369 | 4/1961 | Ruof | 303/21 CE X |
| 3,119,933 | 1/1964 | Allen | 250/106 S X |
| 3,133,197 | 12/1964 | Allen | 250/108 R X |
| 3,363,231 | 1/1968 | Grosgebauer | 105/366 R X |
| 3,389,663 | 6/1968 | Gutridge | 105/366 R |
| 3,466,771 | 9/1969 | Wilson | 280/29 X |
| 3,511,329 | 5/1970 | Wisner | 303/21 CF X |
| 3,597,729 | 8/1971 | Lopez | 340/52 F |
| 3,619,616 | 11/1971 | Smith | 250/108 R |

*Primary Examiner*—Archie R. Borchelt
*Attorney*—Strauch, Nolan, Neale, Nies & Kurz

[57] ABSTRACT

A transport system for conveying nuclear fuel assemblies from a nuclear power plant to a plant for reprocessing or to a burial ground comprising a unique two part shipping cask and a trailer transporter for the cask or casks, constructed on the single spar concept. The novel cask as well as the transporter are constructed with fast neutron as well as gamma ray attenuation materials thereby providing adequate shielding for the formidable array of radiation emitted by spent fuel assemblies used in recent advanced light water converter reactors as well as first generation fast breeder reactors. The trailer transporter may be interchangeably wheeled for transit over conventional roadways or railways, or a modified rail car may be provided onto which the entire cask and trailer transporter may be loaded. A plurality of such cars so loaded form a unit train, having a locomotive to haul the train and a control car immediately therebehind to monitor heat, radiation and stress parameters of each loaded car making up the unit train.

35 Claims, 8 Drawing Figures

PATENTED MAY 8 1973 3,732,427

INVENTORS
ARTHUR G. TRUDEAU
DARROW E. HAAGENSEN

BY Strauch, Nolan, Neale, Nies & Kurz
ATTORNEYS

INVENTORS
ARTHUR G. TRUDEAU
DARROW E. HAAGENSEN

BY Strauch, Nolan, Neale, Nies & Kurz
ATTORNEYS

INVENTORS
ARTHUR G. TRUDEAU
DARROW E. HAAGENSEN

BY Strauch, Nolan, Neale, Nies & Kurz
ATTORNEYS

INVENTORS
ARTHUR G. TRUDEAU
DARROW E. HAAGENSEN

BY Strauch, Nolan, Neale, Nies & Kurz

ATTORNEYS

INTEGRATED TRANSPORT SYSTEM FOR NUCLEAR FUEL ASSEMBLIES

BACKGROUND OF THE INVENTION

The field of the invention relates to a totally integrated transport system for conveying nuclear fuel assemblies from a nuclear power plant to a destination point, for reprocessing of the wastes for recovery of the unburned uranium and plutonium, and created plutonium and its daughters, or for burial. Shipment of such materials has and continues to present formidable problems in that inherent radiation and thermal emission from such fuel assemblies must be attenuated for the health and safety of the general public in accordance with Atomic Energy Commission and Department of Transportation regulations as well as for the personnel directly involved in handling such materials.

The prior art is replete with examples of fuel casks and transport systems designed for first generation nuclear power plant spent fuel assemblies, most of which will be prohibitively expensive, unsafe, or impractical for transporting the nuclear wastes of second and third generation nuclear power plants now operative or under construction, most of which are in the 800 – 1,000 megawatt range or greater, employing reactors of the advanced light water converter variety (either pressurized water or boiling water reactors) liquid metal reactors (sodium and lithium), gas cooled pressurized, and first generation fast breeder reactors of thermal and fast neutron spectra.

The prior art may be summarized as teaching the use of shipping casks up to 30 tons or more in weight and as high as 90 tons which must be lowered into the power plant swimming pool and then loaded with spent fuel assemblies which have been under water for a period of 120 to 180 days to rid the assemblies of a great deal of thermal and radiation activity, as well as for the purpose of monitoring the particular radiation and thermal parameters of the particular spent fuel assembly. The cask is then lifted from the pool and scrubbed after which it loaded onto a trailer bed or railroad car for transport.

The operation described is prohibitively expensive in that cask loading and unloading must be done by remote control, and takes entirely too long in that safety precautions dictate a movement rate from 1 foot per hour for a 30 ton cask to about 1 inch per hour for a 90 ton cask. The operation is unsafe in that cranes presently used to move such casks have a 100–150 ton capacity, giving a safety factor of as little as 50 percent in excess of cask weight. Furthermore, most casks presently used are finned in order to discharge thermal radiation from the spent fuel effectively; the decontamination scrubbing operation is never completely effective to remove all contaminants collected thereon during the fuel loading procedure in the swimming pool. Thirdly, the shielding presently used with such casks is generally only suitable to attenuate primary gamma ray and alpha and beta particles, and is not effective in controlling the recently discovered and more exotic emissions of fast neutrons from the fuel assemblies employed in advanced light water reactors and planned fast breeder reactors.

Several prior United States patents are representative of the extant state of the art of shipping casks and transport systems for spent nuclear fuel assemblies. The primary components of a standard spent fuel shipping cask include a fuel basket for containing the spent fuel rods, inserted in a usually cylindrical cask, although recent developments include casks which are rectangular in cross-section. The walls of the casks are of sandwich construction comprising inner and outer shells of stainless steel encompassing gamma ray shielding made of lead. The outer shell is finned along its sides and bottom in order to expel thermal radiation, as in a cap inserted into one open end of the cask. Normally, an internal coolant circulation system is provided to further assist in drawing off heat, the coolant being air, water or liquid metal. A drawing of such a cask and further explanation thereof may be found in "Cask Designer's Guide" by L. B. Shappert, Report No. ORML – NSIC – 68: UC–80–Reactor Technology. Oak Ridge National Laboratory, February, 1970 (hereinafter referred to as "Cask Guide"), pp. 1–9, FIG. 1.1 (p.7). Almost all of the patented art reflects these basic parts, with minor modifications. U.S. Pat. Nos. 3,073,961 and 3,483,380 disclose such casks employing lead as a gamma ray shielding material. In U.S. Pat. Nos. 3,511,568 and 3,229,096, air is employed as a coolant. A water circulation system is disclosed by U.S. Pat. Nos. 3,046,403 and 3,230,373. Liquid metal is used as a coolant in the cask illustrated in U.S. Pat. No. 3,133,197. Protection against accidental fire is provided by a melting internal shield in U.S. Pat. No. 3,414,727 and by external, separate shield in U.S. Pat. No. 3,391,280. Two examples of a cask having sufficient structural integrity to be supported at its ends are in U.S. Pat Nos. 3,119,933 and 3,484,381, the former showing an internally finned cask which may be loaded on a modified railroad car for shipment, the latter disclosing gamma ray shielding including combined uranium and lead materials.

Numerous examples of more recent cask designs are adequately discussed in "Southern Governors Conference on Transportation of Nuclear Spent Fuel," Southern Interstate Nuclear Board Conference Report No. COMF – 700207, Atlanta, Georgia, February 5–6, 1970 (hereinafter referred to as "SINB Report"). Pages 58–60 therein illustrate modern casks employing depleted uranium gamma ray shielding coupled with a neutron absorber of hydrogenous material, or water in these examples. Rail car transporters (pp. 54–55), truck transporters (pp.61, 166) and combined rail-truck transporters (pp. 71–72) disclosed therein represent current thinking, and the attendant discussion material clearly points out the need for new concepts in the art, due to the fact that such massive trailer loads in excess of existing state and local weight limits cannot be transported over present U.S. roadways without considerable difficulty and objection from numerous authorities. It is doubtful that large scale movements of this type will be permitted.

A summary of present requirements for spent nuclear fuel casks appears in "Shipping Containers for Irradiated Reactor Fuels," Jack D. Robbins and Elmer C. Lush, *Battelle Technical Review*, August, 1968 (Battelle Memorial Institute, Columbus, Ohio) pp. 9–15 (hereinafter referred to as "Batelle Report"). The major Atomic Energy Commission requirements for spent fuel casks drawn from Title 10 of Code of Federal Regulations, part 71, are listed on page 11. The four major criteria for casks under accident conditions include: first: the cask must survive a 30 foot drop followed by loss of coolant and fire, all without impairment of shielding; second: the cask must be able to withstand a 40 inch drop onto a 6 inch diameter by 8 inch long bar (puncture test); third: the cask must function following a fire at 1,475° for 30 minutes, with a fire emissivity factor of 0.9 and container or cask absorptivity of 0.8; and fourth: a water imersion test in three feet of water for 24 hours without loss of contents. Shielding criteria prescribe a maximum dose rate of 10 mr. per hour at a distance of three feet from the cask surface, and 200 mr. per hour at the cask surface, under normal conditions. Under accident conditions, emission must be restricted to no more that 1,000 mr. per hour, three feet from the cask surface. These primary criteria as well as a host of other applicable to cask design are met by the present invention.

Of considerable importance with respect to spent fuel assemblies of third generation BWR (boiling water reactor) and PWR (pressurized water reactor) plants and first generation breeder reactors is the attenuation of fast neutron emissions, the sources of which have been only recently identified. In "Heavy Element Composition of Spent Power Reactor Fuels" by M.J. Bell, Report No. ORNL–TM–2897, Oak Ridge National Laboratory, May, 1970, (hereinafter referred to as "Spent Fuel Compositions Report"), the compositions, activities, and thermal power of isotopes present in spent fuels of planned high burnup levels in excess of 25,000 megawatt days per metric tons of uranium, or MWD/MTU have been studied, using the ORIGEN isotope generation and depletion code. Of startling interst was the determination of the existence of isotopes $^{242}$Cm and $^{244}$Cm, which present serious shielding problems because of their spontaneous fission activity, particularly in the case of the isotope $^{244}$Cm which has a half-life of 17.6 years. The isotope $^{241}$Am is one of the primary sources of heat in spent nuclear fuels. The presence of $^{236}$Pu and its daughters, principally $^{232}$U and its daughters, presents shielding difficulties. Heretofore, this isotope, because of its low concentration, has not been considered in reactor physics calculations and fuel cycle analysis. Recognition of the shielding problems of fast neutrons presented by these high activity isotopes is contemplated in the present invention.

Of further consideration, heretofore not contemplated or considered, is the fact that refabricated fuel assemblies suitable for advanced and fast breeder reactors will contain amounts of spontaneously fissionable transuranium elements, specifically $^{242}$Cm and $^{244}$Cm among others, such elements not being present in virgin nuclear fuel presently used in nuclear power plants. Such virgin fuel is not radioactive and may be shipped safely in conventional drums. But refabricated fuels, and fuels which will be intershipped between fast breeder reactor plants, will have to be shipped in protective casks. The instant invention is entirely suitable to this task.

SUMMARY OF THE INVENTION

Therefore, it is the principal object of this invention to provide a fully integrated nuclear fuel transport system capable of being constructed as a unit train system, for handling the entire annual fuel unloading requirements of an advanced nuclear power plant in but a single operation, said unit train comprising a plurality of individual articulated cars each having a fuel load thereon, a primary control car for monitoring the thermal, radiation, and stress parameters of each individually loaded car, and a locomotive for hauling the unit train.

It is an object of the invention to provide a fully integrated unit train nuclear fuel transport system, each unit comprising four major components, these being a primary shielded cask sub-assembly for initial loading of spent fuel rods, a secondary fuel cask for receiving the spent fuel with the primary sub-assembly, a tertiary, single spar designed trailer transporter, having the secondary cask integrally constructed therein, suitable for rail, roadbed, air or water conveying, and a quatenary, single spar designed railway car for slidably receiving the trailer transporter.

It is another object of the invention to provide the spent fuel cask with gamma ray shielding as well as adequate shielding of hydrogenous material, for fast neutron attenuation of spontaneously fissionable transuranium elements.

It is yet another object of the invention to provide a spent fuel cask transport trailer with gamma ray as well as adequate fast neutron attenuation material.

A still further object of the invention is to provide a lightweight primary fuel cask sub-assembly, which drastically reduces cask loading time and expense, virtually eliminates the decontamination problem, and provides increased safety, all well within the stringent safety requirements of the Atomic Energy Commission and Department of Transportation.

Another object of the invention is to provide a spent fuel cask trailer transporter designed on the single spar concept for safety, weight and cost reduction purposes, and which further presents an extremely low center of gravity in the loaded trailer transporter.

Yet another object of the invention is to provide a spent fuel cask trailer transporter with a computerized brake control system comprising individual brake units coupled to a logic circuitry controlling unit which monitors braking power applied to each wheel to eliminate the possibility of uncontrolled skidding or jackknifing of the trailer transporter when hauled over conventional roadbed surfaces.

Further novel features and other objects of this invention will become apparent from the following detailed description, discussion and the appended claims taken in conjunction with the accompanying drawings.

BRIEF DESCRIPTION OF THE DRAWINGS

Preferred structural embodiments of this invention are disclosed in the accompanying drawings in which.

DESCRIPTION OF THE PREFERRED EMBODIMENTS

Figure 1:
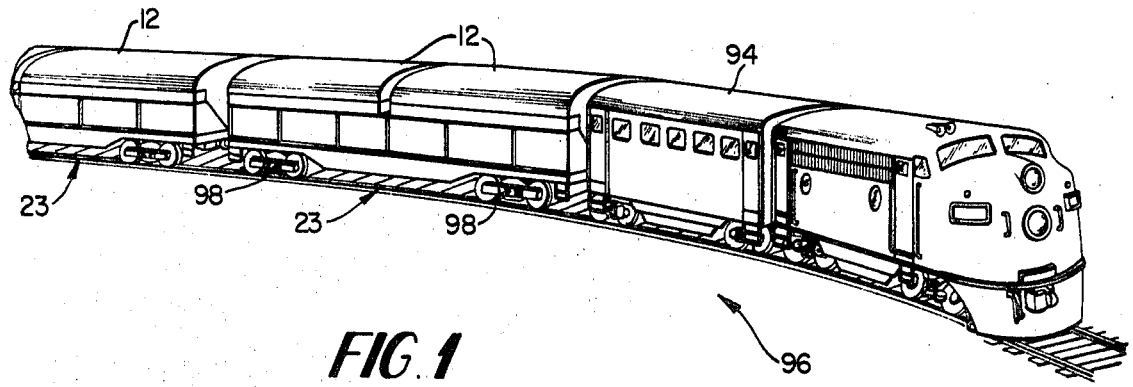
FIG. 1 is a perspective view of the entire invention comprising a unit train of individual cask and transporter units, a control car, and a locomotive.
Figure 2:
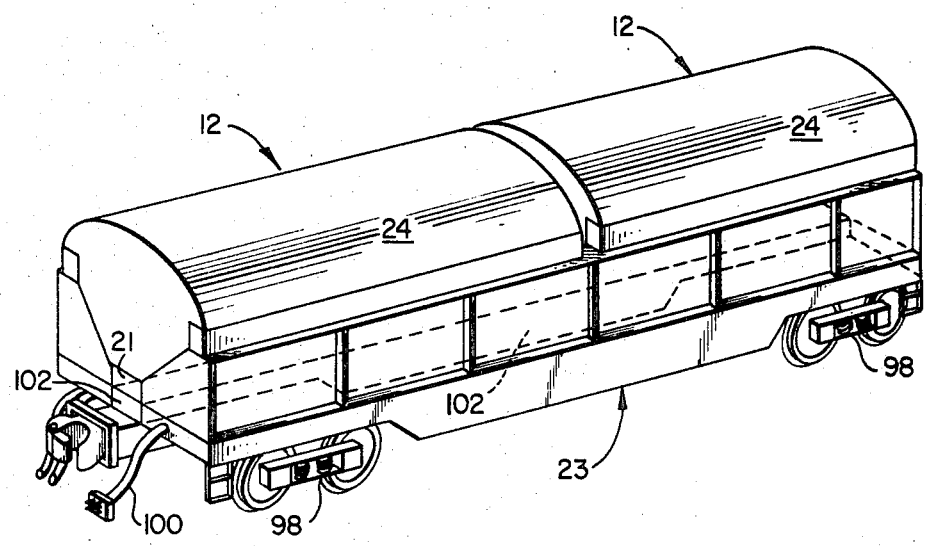
FIG. 2 is a perspective view of the quatenary railcar of the invention, designed on the single spar concept, and internally designed to slidably receive the tertiary, loaded trailer transporter.
Figure 3:
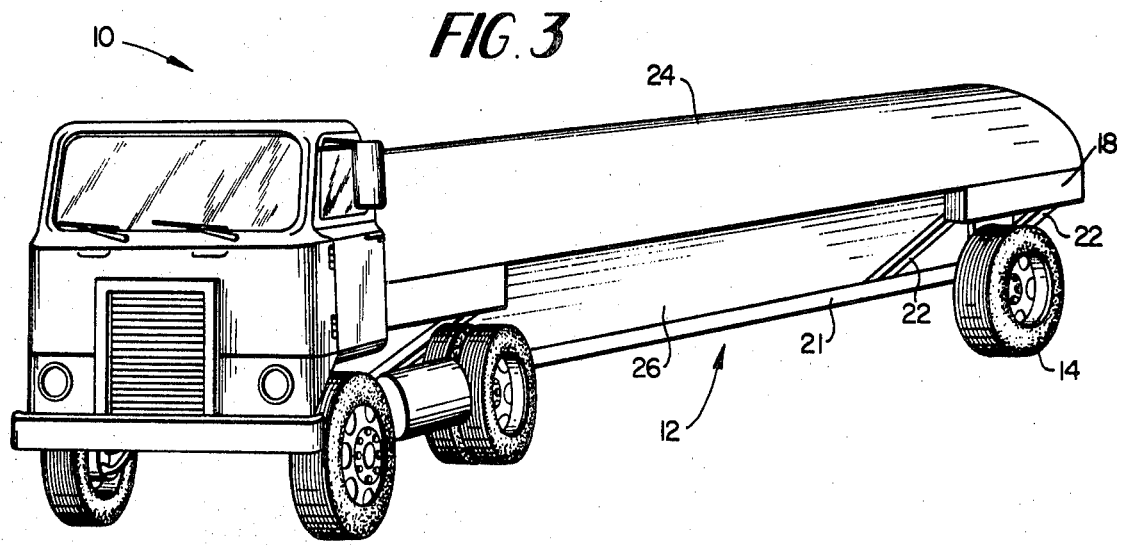
FIG. 3 is a perspective view of the trailer transporter being hauled by a conventional tractor rig.
Figure 4:
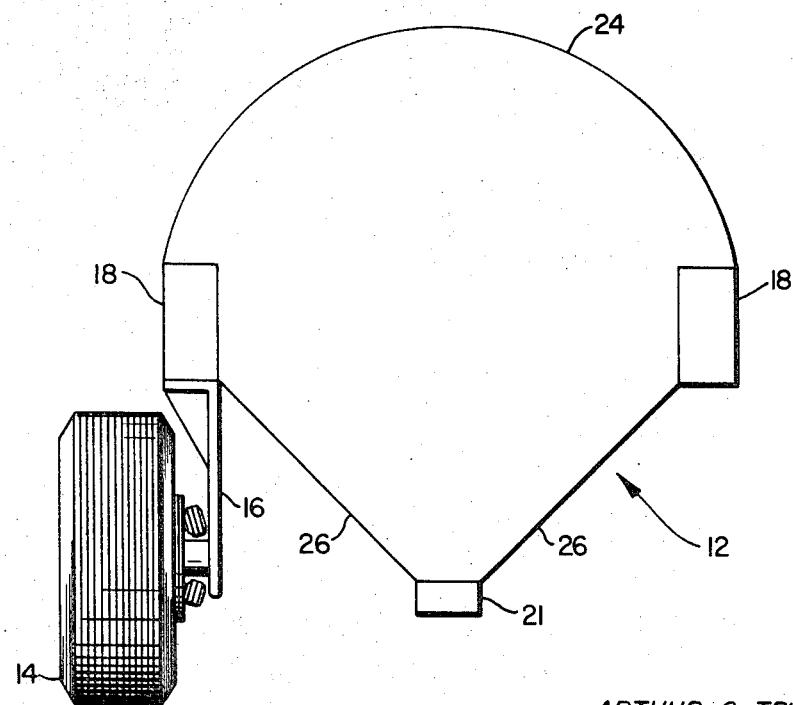
FIG. 4 is a diagrammatic end view of the trailer transporter illustrating one form of support wheel which may be used.

Referring now to the drawings by reference character, the invention, ready for transporting spent nuclear fuel is illustrated in FIG. 3, comprising a conventional tractor 10 and the novel trailer transporter 12, wheeled as at 14. For purposes of illustration, only a single wheel 14 is shown at each corner of trailer transporter 12, but if due to load distribution and size additional wheels are required, they may be added without departing from the scope of the invention. The wheels are of the cross-axleless variety as shown in FIG. 2, each mounted on an axle bracket 16 depending from corner wheel mount 18 of trailer transporter 12. A conventional tire is illustrated in the drawings, but one of the major features of the invention is interchangeability of wheels, for road or rail transit. Wheel 14 may be a cross axleless rail truck instead. The principal structural feature of trailer transporter 12 is the integrity provided by a single support spar 20 (FIG. 5) preferably made of steel, running the entire length of the transporter radiate upwardly and outwardly from the linear integrity provided by spar 20. Base 21 of spar 20 may comprise a skid or roller mechanism for loading the entire transporter onto a modified quaternary trailer or railroad car 23 for transport (FIGS. 1 and 2). Wheel mounts 18 may be reinforced by radiating spars 22 (FIG. 3). The remaining external features of trailer transporter 12 include the usual semi-cylindrical personnel shield 24 preferably made of one-half inch stainless steel sheeting, and depending angle wall elements 26, 26, running the length of transporter 12, from spar 20 to the lengthwise peripheral edges of personnel shield 24.

Figure 5:
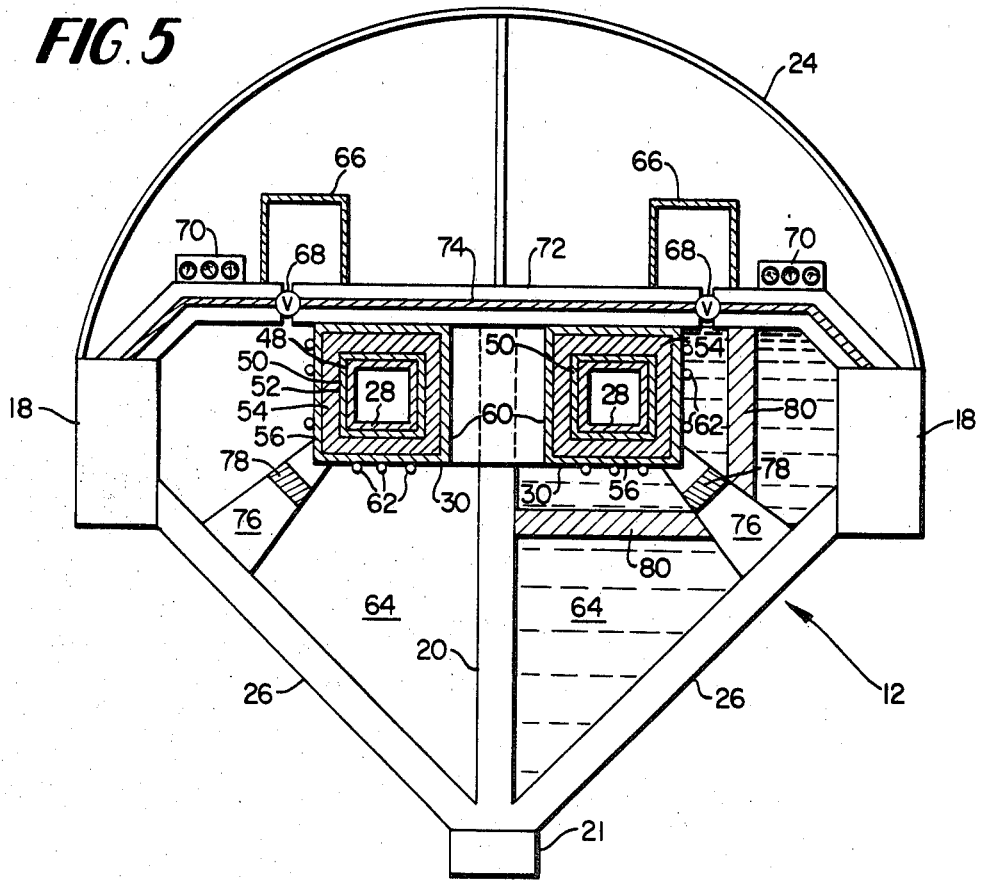
FIG. 5 is a view in cross-section showing internal components of the invention including the primary cask subassembly, the secondary cask and its attendant cooling system and monitoring controls, and the trailer transporter itself.
Figure 6:
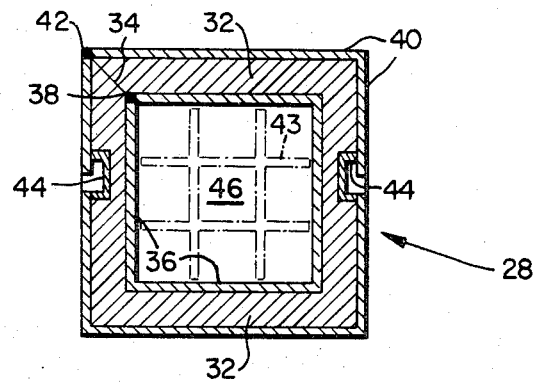
FIG. 6 is a cross-sectional view of the primary cask sub-assembly removed from the primary cask.
Figure 8:
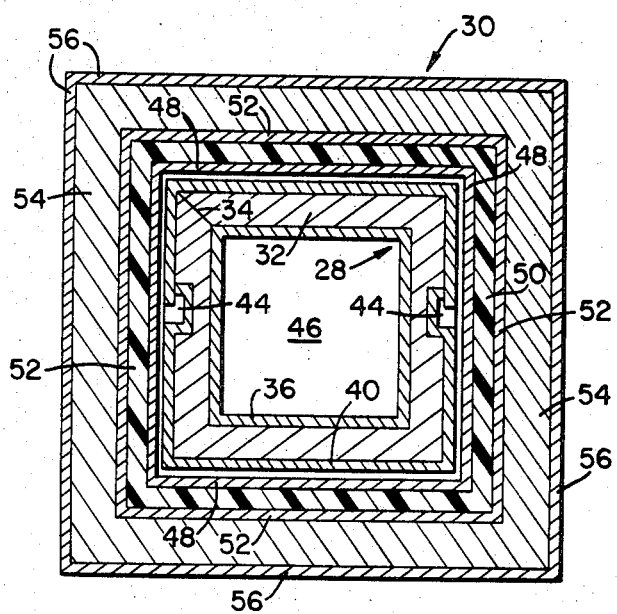
FIG. 8 is a view in cross-section similar to FIG. 6 but showing the removable primary cask sub-assembly loaded into the secondary cask.

Turning now to FIGS. 5 and 6 and 8 the portion of the invention including the primary cask sub-assembly 28 and secondary fuel cask 30 will be discussed in detail. It is important here to comprehend the fact that third generation PWR plants of the 1,100 megawatt variety employ as many as 193 fuel assemblies; each year 64 fuel rod assemblies are replaced. When spent, each such fuel assembly produces on the order of 200,000 BTU's of thermal energy per hour. The present invention in a preferred embodiment is designed to carry two primary cask subassemblies 28, each loaded with a fuel assembly having 204 spent fuel rods (not shown).

Primary cask sub-assembly 28 is an unfinned container having an integral uranium barrier 32, approximately 1.5 inches thick and single seamed at 34, an internal structural shell 36 of stainless steel, about three-sixteenths inch thick and single seam welded at 38, and an exterior cladding of structural stainless steel 40, also about three-sixteenths inch thick and single seam welded at 42. Uranium barrier 32 is constructed or depleted uranium of which there is a considerable supply, it being the by-product of gaseous diffusion uranium fuel enrichment plants. In a preferred embodiment, the internal dimension of lining 36 will be about eight and one-half inches square, the length of the sub-assembly 28 being about 14 feet. Of course, these dimensions are not critical and may be varied from an internal cross-section capacity of about five inches square to an external length up to twenty feet or more, dependent upon the dimension of the fuel rods (not shown) and basket 43 (shown in phantom lines in FIG. 6) to be loaded thereinto. A pair of lift trunnions may be provided at 44, 44 for loading and unloading sub-assembly 28 from the transporter 12 to a nuclear plant spent fuel storage or swimming pool (not shown) and back again.

In the preferred embodiment of a cask sub-assembly 28 having a square internal capacity of about eight and one-half inches and an external length of fourteen feet, total weight will be about 2.5 to 3.0 tons. Sub-assembly 28 further includes a sealed lower end 46 and a removable cap (not shown) for insertion of the spent fuel rod assembly (not shown). It should be noted also that the external surface of cladding 40 is unfinned, a usual requirement of prior art fuel casks for dissipating thermal energy created by the spent fuel assembly. These two factors provide a significant step forward in the art of spent fuel casks. First, the 2.5 to 3.0 ton weight factor means that loading and unloading time of spent fuel rods from the nuclear power plant swimming pool may be drastically reduced, with a consequent and significant cost saving. The present prevailing practice of loading a complete, 30 to 90 ton cask into and out of the storage pool takes an inordinate amount of time, because it must be done by remote control for personnel safety reasons, and such a tremendous weight must be moved very slowly, due to the marginal safety requirement of a 30 to 90 ton load being handled by a 100 to 150 ton capacity crane, this being standard in the industry for moving spent fuel casks. Such an operation yields an effective cask movement rate of about 1 inch to 1 foot per hour. With but only a 2.5 to 3.0 ton load, the operation may be accelerated significantly. Secondly, once the standard finned fuel cask has been loaded and removed from the swimming pool, a lengthy decontamination wash is necessary, which is always only marginally successful as, quite obviously, it is difficult to clean a finned surface. On the other hand, sub-assembly 28 will virtually clean itself, since thermal energy being produced by the loaded fuel assembly is sufficient to dry the surface of cladding 40 as it is removed from the pool. Immediately thereafter, this relatively small primary cask 28 may be quickly and easily inserted into the secondary fuel cask 30, constructed as a unitary member with transporter 12.

Secondary cask 30 is integral with transporter 12 and comprises five essential layers in cross-section including inner stainless steel shell 48, neutron attenuating material 50, a secondary stainless steel shell 52, uranium gamma ray shielding 54, and an external stainless steel cladding 56. Of course, cask 30 will also include the normal primary coolant system (not shown) with attendant check valves and pressure monitoring devices, which preferably will be a water system. Support bays 60 for casks 30,30 may also be provided with a secondary coolant system shown partially at 62 which is entirely contained within transporter 12.

Neutron attenuating material 50 may be selected from a variety of hydrogenous materials although in a preferred embodiment, this material will be a polypropylene plastic or wet plaster. Other high hydrogen content material include, but are not limited to, paraffin and water. The required cross-section dimensions of such a layer 50 will depend on safety requirements coupled with weight and effectiveness of the material involved. Additionally, the internal area 64 beneath cask transport bays 60 may also be filled with similar hydrogenous material. In the case of the use of a liquid or viscous material such as paraffin, a storage tank 66 is provided, together with a pressure valve 68 communicating with area 64. Each cask may be monitored at instrumentation data panel 70 and remoted to control car 94 of unit train 96. Such necessary readings as external and internal cask pressures, temperature and gamma ray and neutron emission internally and externally of the casks 30, and transporter 12 and railroad car 23 stress parameters are constantly checked and recorded.

The remaining structural and shielding components of transporter 12 include cask bay suspension floor 72, which may include a gamma ray and/or neutron shield 74, and cask support blocks 76 which may have similar shielding at 78. Furthermore, area 64 may have additional gamma ray (uranium) shielding 80 as illustrated to the right in FIG. 3. Dual purposes are served: first, to attenuate radiation emissions and secondly, to even further effectively lower the center of gravity of the invention for greater safety during transit of spent fuel assemblies.

Normally, hydrogenous material 50 serves as a safety factor under accidental fire conditions, it being allowed to melt and escape the cask through appropriate holes in the outer portion of the cask (not shown) in order to create a fire shield void about the fuel basket in the center of the cask. The present invention comprehends this utility as well as the fact that the material may serve a neutron attenuation function. The use of wet plaster in such an environment is a relatively new concept and is more fully detailed and described in "Examination of the International Atomic Energy Agency's Regulations for the Safe Transport of Radioactive Materials," EUR — 3485 e, f, Vol. IV (1968). See also "Cask Guide," supra, pp. 86, 94.

Figure 7:
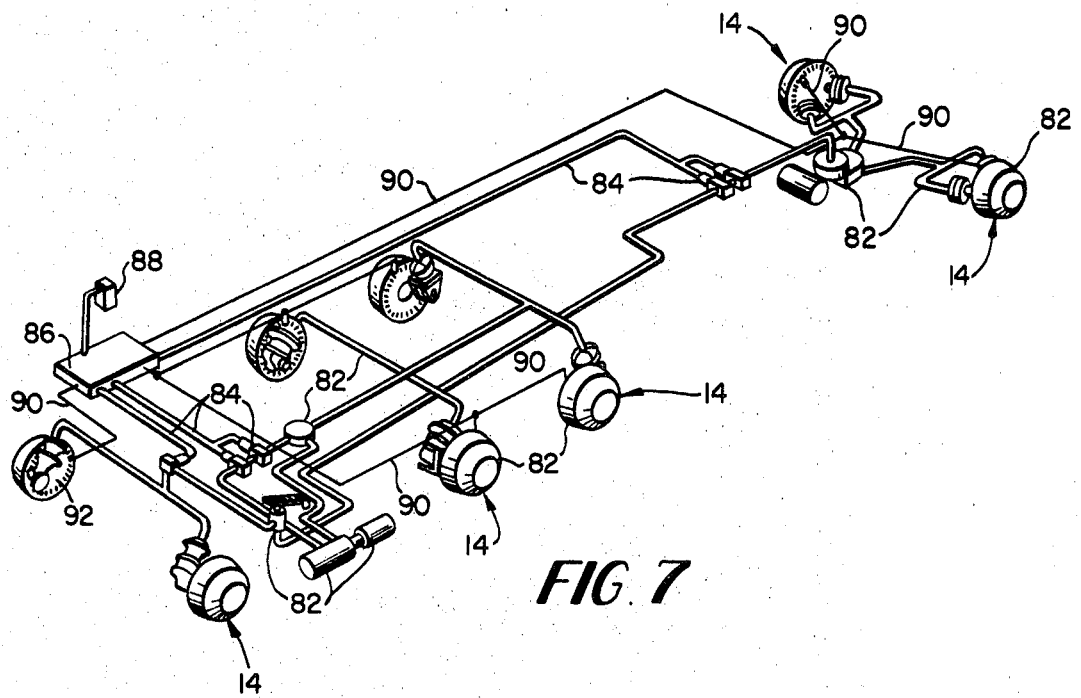
FIG. 7 is a diagrammatic view of a logic circuitry controlled braking system that may be employed in the instant invention.

Another major feature of the instant invention is the provision of a logic circuitry controlled braking system for imparting yet a further degree of safety in the transport of spent nuclear fuels. Such a system is made by the North American Rockwell Corporation under the trademark "Skid-Trol" and the principal components thereof are diagrammatically illustrated in perspective in FIG. 7. The usual air brake system and attendant feeder lines are indicated at 82, and are controlled from the air control system 84, governed from a computer 86, having a visual condition indicating system 88 for the cab driver. A sensing system 90 reads the rate of revolution of each wheel 14 and feeds the information to the computer, whereupon braking effort to each wheel is increased or decreased to maintain vehicle control. For example, in a skid situation, one or more wheels will be locked. Computer 86 reads this condition through the sensing system 90 and then relieves brake pressure on the other wheels to relieve the skid condition well before the vehicle becomes uncontrollable. At low speeds, the system is automatically deactivated so that the wheels can be locked for holding or parking. Control for computer 86 is established through one or more reference wheels, these usually being the front wheel or wheels of the cab 92, 92, the controlled wheels being the remaining wheels of the rig. When the ratio of controlled wheel speed decreases to unacceptable limits with respect to the reference wheel speed, the computer is activated to return controlled wheel speeds to a predetermined equilibrium. Further information concerning this particular computer controlled braking system will be found in Bulletin No. SP–7015, North American Rockwell Corporation, Transmission and Axle Division, 1970.

FIGS. 1 and 2 illustrate a form of the novel unit train concept of the instant invention. By way of specific example, the use of the invention will be explained as it relates to the annual fuel loading requirements of a third generation, pressurized water reactor plant in the 800 megawatt range. The reactor of such a plant has 156 fuel assemblies, 52, or one-third of which are changed annually for fresh or refabricated fuel. The burnup rate of such fuel is approximately 25,000 MWD/MTU to 35,000 MWD/MTU. Each fuel assembly contains 204 fuel rods, the assembly being about 14 feet long and 8.5 inches square and weighing 1,525 lbs. Each rod comprises a zirconium tube, 0.030 inch thick loaded with uranium dioxide pellets, with an 11 to 14 percent of total length space at the top to compensate for gaseous expansion of fission products, such as $^{131}$I.

Unit train 96 will, in this embodiment, comprise 13 railroad cars 23, each loaded with a transporter 12 having two casks 30 therein, the capacity of the train being 26 fuel assemblies. The first stage of fuel unloading involves removal of spent fuel assemblies from the reactor to the reactor swimming pool (not shown) where each fuel assembly remains for up to 180 days to rid the assembly of a great deal of thermal energy and radiation, as well as to monitor each assembly to determine its particular thermal, radiation and integrity parameters. At this point, unit train 96 is back up to the shipment door of the plant on a railroad spur where each of the transporters 12 with primary casks 28, 28 may be unloaded (not shown). In a preferred embodiment, a string of 13 transporters may be pulled off of 13 cars together by a winch of hydraulic mechanism. Casks 28 are then unloaded from their respective transporters and brought to the swimming pool for loading.

A loaded cask 28 will weigh but only 2.5 to 3.0 tons, unlike present day practice of loading an entire 35 ton to 90 ton cask into the pool. Thus, a loaded cask 28 may be removed from the pool expeditiously, by remote control, and loaded into its transporter 12, two casks to each transporter. After loading, an entire string of 13 transporters may be slid into unit train 96 for shipment. The procedure as broadly outlined is obviously speedy and efficient; it will take less than a day to handle the entire annual fuel requirements of the power plant described, and will eliminate the present cumbersome and costly practice of periodic loading and unloading of single fuel assemblies over a long period of time.

In the case of a plant employing refabricated fuel of the spontaneously fissionable variety, the reverse of the process just described will take plate in loading fuel into the plant save for the swimming pool step, of course.

Employment of the unit train concept yields a safe and efficient operation, well within the present requirements of the Atomic Energy Commission and Department of Transportation, and inherently presents a system that may be engineered to even stricter requirements of shipment safety, that may be established in the near future. Each individual railroad car 23 is conventionally coupled together and is supported on conventional articulated trucks 98. Each coupling will include detachable electrical coupling means 100 to convey readout information from each cask and transporter to control car 94 for monitoring as hereinbefore set forth. Control car 94 includes both primary and redundant secondary electrical power means such as diesel powered generators (not shown) and each railroad car 23 is provided with a tertiary redundant power source (not shown) in the event of failure of power in the control car or accidental uncoupling of an individual car 23 with its loaded transporter 12 thereon. Each car 23 is also designed on the single spar concept, similar to transporter 12, as at 102 for structural integrity. The interior of each car 23 is V-shaped in cross-section to conform to the bottom configuration of transporter 12. Anti-friction means (not shown) may be provided therein to cooperate with means 21 on transporter 12 to facilitate a horizontal sliding loading and unloading of each transporter 12 onto its car 23.

Hereinbefore, the loading and unloading of each cask 28 into secondary cask 30 of transporter 12 has been set forth as a horizontal, sliding insertion operation. However, if desired, each cask 28 may be inserted in a top loading operation. In this situation, personnel shield 24 would be either hinged to top floor 72 or otherwise removable therefrom, and top floor 72 would include hinged covers running the length thereof, immediately above bays 60,60, each including the top wall of secondary cask 30 in order to expose the lengthwise interior of secondary cask 30. Primary casks 28 would then be crane lowered into casks 30, the hinged covers of floor 72 replaced, and personnel shield 24 put back in position to complete the loading process. Obviously, unloading casks 28,28, would merely involve reversing the steps outlined in this embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An integrated nuclear fuel transport system for transporting a nuclear fuel assembly including fuel rods in a basket or the like comprising:
   a. A primary cask sub-assembly having radiation shielding within its walls for receiving a fuel assembly including nuclear fuel rods in a basket or the like;
   b. A secondary cask assembly having radiation and thermal energy shielding within its walls, for receiving said primary cask sub-assembly, said primary cask sub-assembly being separable therefrom; and
   c. A trailer transporter having at least one support bay therein integrally receiving said secondary cask assembly having said primary cask sub-assembly therewithin.

2. The invention as recited in claim 1, wherein said primary cask sub-assembly comprises:
   a. An inner shell of structurally rigid material serving as a hopper for a spent nuclear fuel assembly having a plurality nuclear fuel rods;
   b. An intermediate shell of radiation absorbing material; and
   c. An outer cladding of structurally rigid material encasing said intermediate shell.

3. The invention as recited in claim 2, wherein both said inner shell and outer cladding are made of stainless steel.

4. The invention as recited in claim 2, wherein said intermediate shell is made of uranium.

5. The invention as recited in claim 1, wherein said secondary cask assembly comprises:
   a. An inner shell of structurally rigid material serving as a hopper for said primary cask sub-assembly;
   b. A shield of hydrogenous material adjacent said secondary cask inner shell for attenuating neutron emissions from spontaneously fissionable transuranium elements;
   c. A shield of gamma ray, alpha particle and beta particle absorbing material adjacent said hydrogenous material shield for attenuating emissions caused by radioactive decay; and
   d. An outer cladding of structurally rigid material encasing said gamma ray shield.

6. The invention as recited in claim 5, wherein said secondary cask further comprises an intermediate shell of structurally rigid material interposed between said hydrogenous material shield and said gamma ray shield.

7. The invention as recited in claim 6, wherein said secondary cask inner shell, outer cladding, and intermediate shell are made of stainless steel.

8. The invention as recited in claim 5, wherein said gamma ray shield is made of uranium.

9. The invention as recited in claim 5, wherein said hydrogenous material comprises wet plaster.

10. The invention as recited in claim 1, wherein said trailer transporter comprises:
    a. A substantially vertically disposed elongate support spar running the length of said transporter;
    b. A substantially horizontal floor mounted on top of said support spar;

c. At least one secondary cask support bay integrally mounted therein adjacent the junction of said support spar and floor, beneath said floor; and d. At least one pair of wheel support means located at corners of said transporter.

11. The invention as recited in claim 10, wherein said transporter includes a pair of secondary cask support bays, one to each side of said support spar beneath said floor.

12. The invention as recited in claim 10, wherein each of said secondary cask support bays further comprises an external circulating cooling system for dissipating thermal energy emitted from said secondary cask.

13. The invention as recited in claim 10, wherein said trailer transporter further comprises:

a. A pair of elongate structural side wall means interconnecting the outer longitudinal edges of said floor and the base of said support spar; and b. A plurality of support blocks disposed along at least one of said side wall means for supporting said secondary cask support bay along the length thereof.

14. The invention as recited in claim 13, wherein a space defined by said floor, side wall means, support bay and support spar is filled with hydrogenous material.

15. The invention as recited in claim 14, wherein said floor includes a hydrogenous material supply tank mounted thereupon, communicated to said space through check valve means.

16. The invention as recited in claim 14, wherein said hydrogenous material filled space includes at least one layer of gamma ray absorbing material interposed therein.

17. The invention as recited in claim 16, wherein each of said support blocks includes a layer of gamma ray absorbing material interposed therein.

18. The invention as recited in claim 14, wherein said space filling hydrogenous material comprises paraffin.

19. The invention as recited in claim 14, wherein said space filling hydrogenous material comprises wet plaster.

20. The invention as recited in claim 14, wherein said space filling hydrogenous material comprises water.

21. The invention as recited in claim 10, wherein said floor includes an interposed layer of radiation shielding.

22. The invention as recited in claim 10, wherein said transporter further comprises a semi-cylindrical personnel shield mounted over said floor.

23. The invention as recited in claim 10, wherein said wheel supports are four in number, one at each corner of said trailer transporter, each wheel support including:

a. A removable axle bracket; and b. A wheel mounted on said axle bracket.

24. The invention as recited in claim 23, wherein said wheels include a logic circuitry controlled braking system comprising:

a. Braking means on each wheel;

b. Sensing means on each wheel reading the rotational speed thereof;

c. Logic circuitry means for reading and comparing data from the sensing means with a programmed reference speed; and d. Control means from the logic circuitry means to the braking means applying braking power to each wheel in response to impulses from said logic circuitry means.

25. The invention as recited in claim 1, wherein said integrated nuclear fuel transport system further comprises a railroad car having an internal upwardly facing configuration conforming to the underside configuration of said trailer transporter for removably slidably receiving said trailer transporter thereon.

26. The invention as recited in claim 25, wherein said integrated nuclear fuel transport system further comprises a unit train having:

a. Locomotive means for the train;

b. A plurality of said railroad cars each having said trailer transporter thereon; and c. A control car interposed between said locomotive means and said plurality of railroad cars, for monitoring and recording at least thermal, radiation and pressure parameters of each transporter loaded railroad car.

27. A nuclear fuel cask assembly for a nuclear fuel assembly including fuel rods in a basket or the like comprising:

a. A primary cask sub-assembly having radiation absorbing material in the walls thereof for receiving a nuclear fuel assembly having nuclear fuel rods in a basket or the like therein; and b. A secondary cask assembly having radiation and thermal energy shielding within its walls, for receiving said primary cask sub-assembly therein, said primary cask sub-assembly being separable therefrom.

28. The invention as recited in claim 27, wherein said primary cask sub-assembly comprises:

a. An inner stainless steel shell arranged as a hopper for a spent nuclear fuel assembly;

b. An intermediate layer of uranium shielding; and c. An outer cladding of stainless steel, encasing said uranium shielding.

29. The invention as recited in claim 28, wherein said uranium shielding is of substantial thickness with respect to said inner stainless steel shell, said inner shell and outer cladding being approximately equal in thickness.

30. The invention as recited in claim 27, wherein said secondary cask assembly comprises:

a. An inner stainless steel shell arranged to receive said primary cask sub-assembly;

b. A layer of hydrogenous, neutron absorbing and reflecting material surrounding said secondary cask inner shell;

c. Uranium shielding enveloping said secondary cask hydrogenous material; and d. An outer cladding of stainless steel about said secondary cask uranium shielding.

31. The invention as recited in claim 30, wherein said secondary cask assembly further comprises an intermediate stainless steel shell, interposed between said secondary cask uranium shielding and hydrogenous material.

32. The invention as recited in claim 30, wherein said hydrogenous material is made of water.

33. The invention as recited in claim 30, wherein said hydrogenous material is made of wet plaster.

34. The invention as recited in claim 30, wherein said hydrogenous material is made of paraffin.

35. The invention as recited in claim 30, wherein said hydrogenous material is made of polypropelene plastic.

* * * * *

UNITED STATES PATENT OFFICE
CERTIFICATE OF CORRECTION

Patent No. 3,732,427               Dated  May 8, 1973

Inventor(s) Arthur G. Trudeau et al

It is certified that error appears in the above-identified patent and that said Letters Patent are hereby corrected as shown below:

*Column 1, line 43, insert --is-- after "it".

Column 2, line 30, insert --an-- after "by".

*Column 3, line 10, change "imersion" to --immersion--.

*Column 4, lines 17 & 18, change "quantenary" to --quarternary--

*Column 4, line 60 change "quantenary" to --quarternary--.

*Column 5, line 10, change "primary" to --secondary--.

*Column 5, line 40, change "radiate" to --radiating--.

*Column 5, line 43, change "quatenary" to --quarternary--.

Column 5, line 53, delete "and" first occurrence insert a comma (,) after "5".

Column 6, line 8, change "or" to --of--.

Column 6, line 14, change "14" from boldface type to regular type.

Column 8, line 32, change "156" from boldface type to regular type.

Column 8, line 32 change "52" from boldface type to regular type.

*Column 8, line 44, change "a" to --two--.

*Column 8, line 44, pluralize "transporter" to read --transporters--.

UNITED STATES PATENT OFFICE
CERTIFICATE OF CORRECTION

Patent No. 3,732,427     Dated May 8, 1973

Inventor(s) Arthur G. Trudeau et al     Page - 2

It is certified that error appears in the above-identified patent and that said Letters Patent are hereby corrected as shown below:

*Column 8, line 46, change boldface "26" to regular --52--.

*Column 8, line 53, change "back" to --backed--.

*Column 8, line 57, change boldface "13", first occurrence, to regular --26--.

*Column 8, line 57, change boldface "13" second occurrence to regular --13--.

*Column 9, line 2, change "13" to --26--.

Column 9, line 12, change "plate" to --place--.

*Column 10, line 25, Claim 2(a) insert --of-- after "plurality".

*Column 13, line 4, change "polypropelene" to --polypropylene--.

Correct middle initial of second inventor's name from "F" to --E-- on title page.

Signed and sealed this 20th day of November 1973.

(SEAL)
Attest:

EDWARD M. FLETCHER, JR.
Attesting Officer

RENE D. TEGTMEYER
Acting Commissioner of Patent